(12) United States Patent
Lee et al.

(10) Patent No.: US 12,039,131 B2
(45) Date of Patent: Jul. 16, 2024

(54) ELECTRONIC DEVICE AND METHOD FOR CONTROLLING TOUCH FUNCTION

(71) Applicant: SAMSUNG ELECTRONICS CO., LTD., Suwon-si (KR)

(72) Inventors: Heonseok Lee, Suwon-si (KR); Wooyoung Oh, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/103,703

(22) Filed: Jan. 31, 2023

(65) Prior Publication Data
US 2023/0176689 A1 Jun. 8, 2023

Related U.S. Application Data

(63) Continuation of application No. PCT/KR2021/009947, filed on Jul. 30, 2021.

(30) Foreign Application Priority Data

Aug. 4, 2020 (KR) .................. 10-2020-0097678

(51) Int. Cl.
G06F 3/044 (2006.01)
G06F 3/041 (2006.01)

(52) U.S. Cl.
CPC ........ G06F 3/04166 (2019.05); G06F 3/0418 (2013.01)

(58) Field of Classification Search
CPC .. G06F 3/04166; G06F 3/0418; G06F 3/0446; G06F 3/04184; G06F 3/044; G09G 2354/00; G09G 5/003
See application file for complete search history.

(56) References Cited

U.S. PATENT DOCUMENTS

| 9,766,730 | B2 | 9/2017 | Lee |
| 9,823,777 | B2 | 11/2017 | Takayama et al. |
| 10,013,103 | B2 | 7/2018 | Hiratsuka et al. |
| 10,684,730 | B2 | 6/2020 | Azumi et al. |
| 2012/0056835 | A1 | 3/2012 | Choo et al. |
| 2013/0069894 | A1 | 3/2013 | Chen et al. |

(Continued)

FOREIGN PATENT DOCUMENTS

| JP | 2014006413 A | 1/2014 |
| JP | 2014203102 A | 10/2014 |

(Continued)

OTHER PUBLICATIONS

Written Opinion (ISA/237) dated Nov. 8, 2021 by the International Searching Authority in International Application No. PCT/KR2021/009947.

(Continued)

Primary Examiner — Md Saiful A Siddiqui
(74) Attorney, Agent, or Firm — Sughrue Mion, PLLC

(57) ABSTRACT

An electronic device includes a touch sensor integrated circuit (IC) and a display driver IC. The display driver IC is configured to: obtain information for a display update, and provide, to the touch sensor IC, a first driving signal including (i) a first pulse indicating an address scan period in which the information is recorded via application of a voltage and (ii) a second pulse indicating a self-scan period in which the recorded information is maintained without application of the voltage. Furthermore, while the first driving signal is provided from the display driver IC, the touch sensor IC is configured to: perform a first operation based on detection of the first pulse, and perform a second operation based on detection of the second pulse.

17 Claims, 11 Drawing Sheets

(56) References Cited

U.S. PATENT DOCUMENTS

| | | |
|---|---|---|
| 2014/0253485 A1 | 9/2014 | Kida et al. |
| 2014/0292688 A1 | 10/2014 | Munechika |
| 2015/0220170 A1 | 8/2015 | Nam et al. |
| 2016/0299618 A1 | 10/2016 | Liu et al. |
| 2016/0342277 A1 | 11/2016 | Lu et al. |
| 2017/0046039 A1 | 2/2017 | Karunamuni et al. |
| 2017/0147143 A1* | 5/2017 | Jung .................... G06F 3/0412 |
| 2018/0004320 A1* | 1/2018 | Polishchuk ........... G06F 3/0446 |
| 2018/0188863 A1 | 7/2018 | Yi et al. |
| 2019/0102017 A1* | 4/2019 | Kim ..................... G06F 3/0445 |
| 2019/0294310 A1 | 9/2019 | Lee et al. |
| 2021/0020664 A1* | 1/2021 | Tan ......................... G09G 3/20 |
| 2021/0200354 A1* | 7/2021 | Kang .................... G09G 3/3258 |
| 2021/0312868 A1* | 10/2021 | Kim ..................... G09G 3/3266 |
| 2021/0397327 A1 | 12/2021 | Lee |

FOREIGN PATENT DOCUMENTS

| | | |
|---|---|---|
| KR | 1020110076051 A | 7/2011 |
| KR | 1020130062207 A | 6/2013 |
| KR | 1020140021222 A | 2/2014 |
| KR | 1020140075319 A | 6/2014 |
| KR | 1020150062378 A | 6/2015 |
| KR | 1020170043983 A | 4/2017 |
| KR | 1020170060197 A | 6/2017 |
| KR | 1020180014446 A | 2/2018 |
| KR | 1020180034779 A | 4/2018 |
| KR | 1020180079088 A | 7/2018 |
| KR | 1020190112593 A | 10/2019 |
| KR | 1020210027003 A | 3/2021 |
| KR | 1020210156057 A | 12/2021 |

OTHER PUBLICATIONS

International Search Report (ISA/210) dated Nov. 8, 2021 by the International Searching Authority in International Application No. PCT/KR2021/009947.
Communication dated Nov. 15, 2023 by the European Patent Office for European Patent Application No. 21854152.2.

* cited by examiner

ELECTRONIC DEVICE AND METHOD FOR CONTROLLING TOUCH FUNCTION

TECHNICAL FIELD

This disclosure relates to an electronic device and method for controlling driving of a touch sensor or a display to reduce interference between display and touch on a touch screen.

BACKGROUND ART

As the use of portable electronic devices has become common due to the development of mobile communication technology, the demand for thinner and more convenient products has increased. As a result, portable electronic devices having a touch screen have become common, with growing demand. Due to a touch screen's intuitive input/output method and convenient functions, touch screens are used in wide array of devices and applications including general home appliances, large displays, and portable electronic devices such as smartphones and tablet devices.

A touch panel included in the touch screen may include a plurality of electrodes. Because these electrodes may be conductors, mutual capacitance may be formed between the electrodes. For example, when the touch panel is implemented as a capacitive type, the electronic device may apply a driving signal to at least one electrode of the touch panel (e.g., a driving electrode), where the driving electrode may generate an electric field. The other electrodes may output electrical signals based on the electric field generated from the driving electrode. In a structure in which a touch panel of a touch screen and a display panel are adjacent to each other, such as a flexible display, a foldable display, or a rollable display, a driving signal applied to the touch panel may act as noise for the display panel, thereby affecting the display quality of the touch screen.

DETAILED DESCRIPTION OF THE INVENTION

Technical Problem

According to some embodiments, an electronic device comprises: a touch sensor integrated circuit (IC); and a display driver IC, in which the display driver IC is configured to: obtain information for a display update, and provide, to the touch sensor IC, a first driving signal including (i) a first pulse indicating an address scan period in which the information is recorded via application of a voltage and (ii) a second pulse indicating a self-scan period in which the recorded information is maintained without application of the voltage, and in which, while the first driving signal is provided from the display driver IC, the touch sensor IC is configured to: perform a first operation based on detection of the first pulse, and perform a second operation based on detection of the second pulse.

The first operation is an operation of, based on a detection of the first pulse while the first driving signal is provided, causing the touch sensor IC to scan touch data inputted through at least one touch sensor device with a first periodicity, and, while the first driving signal is provided, the touch sensor IC is configured to change a scan periodicity of the touch data in response to determining that the first pulse is changed to the second pulse.

The first operation is an operation of, based on a detection of the first pulse while the first driving signal is provided, causing the touch sensor IC to discontinue scanning of touch data inputted through at least one touch sensor device.

The second operation is an operation of, based on a detection the second pulse while the first driving signal is provided, causing the touch sensor IC to scan touch data inputted through the at least one touch sensor device with a second periodicity different from the first periodicity.

According to some embodiments, an electronic device comprises: a touch sensor integrated circuit (IC); and a display driver IC, in which the display driver IC is configured to: obtain information for a display update, determine an address scan period in which the information is recorded via application of a voltage based on a first driving signal, and provide, to the touch sensor IC, a second driving signal indicating the address scan period and a self-scan period in which the recorded information is maintained without application of the voltage, and in which the touch sensor IC is configured to: perform a first operation in correspondence with the address scan period of the second driving signal, and perform a second operation in correspondence with the self-scan period of the second driving signal.

The first driving signal includes at least one of a first pulse related to the address scan period or a second pulse related to the self-scan period.

The display driver IC generates the second driving signal to indicate the address scan period or the self-scan period in correspondence with a pulse change timing of the first driving signal, in which the address scan period of the second driving signal corresponds to a period from a time of generating a first pulse to a time of generating the second pulse of the first driving signal, and in which the self-scan period of the second driving signal corresponds to a period from the time of generating the second pulse to the time of generating the first pulse of the first driving signal.

The first operation is an operation of causing the touch sensor IC to scan touch data inputted through at least one touch sensor device with a first periodicity during the address scan period of the second driving signal, and the touch sensor IC is configured to change a scan periodicity of the touch data in response to a change in a level of the second driving signal.

The first operation is an operation of causing the touch sensor IC to discontinue scanning of touch data inputted through at least one touch sensor device during the address scan period of the second driving signal.

The second operation is an operation of causing the touch sensor IC to scan touch data inputted through at least one touch sensor device with a second periodicity different from the first periodicity during the self-scan period of the second driving signal.

The display driver IC is configured to: determine a clock cycle corresponding to a display driving frequency, and generate the first pulse according to the clock cycle while providing the first driving signal.

The touch sensor IC is configured to select filter information for correction of touch data based on a clock cycle in which a first pulse is generated in the first driving signal.

According to some embodiments, an electronic device comprises: a touch sensor integrated circuit (IC); and a display driver IC, in which the touch sensor IC is configured to: determine a noise level of at least one touch sensor device, and generate a driving signal for controlling the display driver IC in correspondence with the determined noise level, and in which the display driver IC is configured to perform an operation based on the driving signal.

Based on a determination the determined noise level is equal or greater than a threshold level, the touch sensor IC sets the driving signal to a high level, and based on a determination the determined noise level is less than the threshold level, the touch sensor IC sets the driving signal to a low level.

The operation is an operation of causing the display driver IC to maintain a specified display driving frequency during a period of the driving signal in which the driving signal is set to a high level.

According to some embodiments, an electronic device, comprises: a touch sensor integrated circuit (IC); a display driver IC; and a display module comprising a plurality of pixels, in which the display driver IC is configured to: obtain image data, and provide, to the touch sensor IC, a first driving signal including (i) a first pulse indicating an address scan period in which the image data is displayed on the display module via application of a voltage to at least one pixel from the plurality of pixels, and (ii) a second pulse indicating a self-scan period in which the display of the image data is maintained without application of the voltage.

While the first driving signal is provided from the display driver IC, the touch sensor IC is configured to: perform a first operation based on detection of the first pulse, and perform a second operation based on detection of the second pulse.

The first operation is an operation of, based on a detection of the first pulse while the first driving signal is provided, causing the touch sensor IC to scan touch data inputted through at least one touch sensor device with a first periodicity.

While the first driving signal is provided, the touch sensor IC is configured to change a scan periodicity of the touch data in response to determining that the first pulse is changed to the second pulse.

The first operation is an operation of, based on a detection of the first pulse while the first driving signal is provided, causing the touch sensor IC to discontinue scanning of touch data inputted through at least one touch sensor device.

Advantageous Effects

According to various embodiments, an electronic device and method for controlling driving of a touch sensor or a display to minimize an influence between the touch sensor and the display may be provided. The electronic device and method according to various embodiments of the disclosure may detect and avoid noise interference that may occur between a touch sensor and a display, and prevent the degradation of the touch performance and display quality of a touch screen.

BRIEF DESCRIPTION OF DRAWINGS

Other aspects, features and benefits of specific preferred embodiments of the disclosure as described above will become more apparent from the following description taken in conjunction with the accompanying drawings.

MODE FOR CARRYING OUT THE INVENTION

Figure 1:
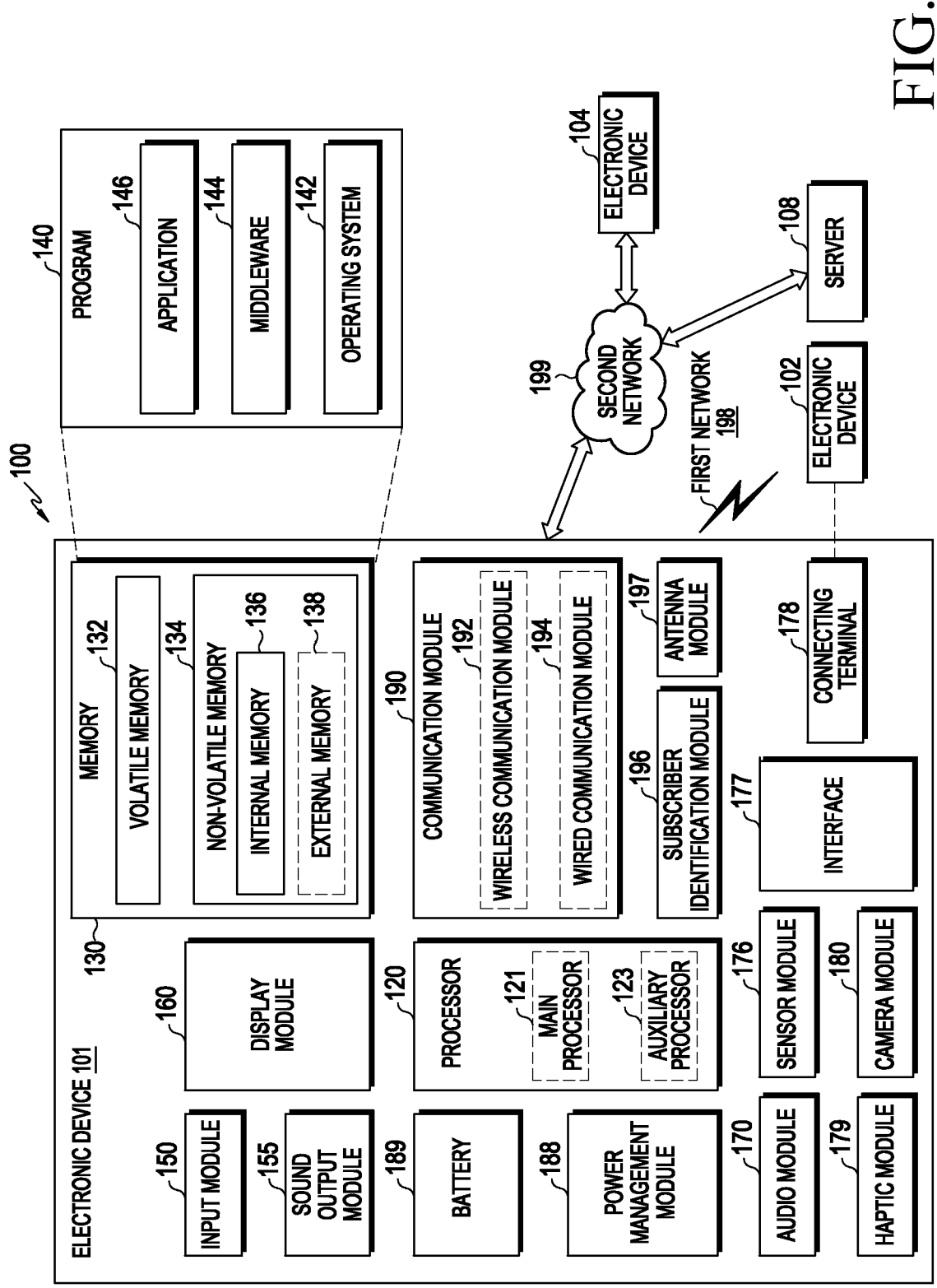
FIG. 1 is a diagram illustrating an electronic device in a network environment, according to various embodiments of the disclosure.

Various embodiments of the disclosure are described with reference to the accompanying drawings. However, they are not intended to limit the technical scope of the disclosure, and it is to be understood that the disclosure covers various modifications, equivalents, and/or alternatives. With regard to the description of the drawings, similar reference numerals may be used to refer to similar components.

In the disclosure, the term "have", "may have", "include", or "may include" signifies the presence of a corresponding feature (e.g., number, function, operation, or component such as part), not excluding the presence of one or more other features.

The term "configured to" as used herein may be replaced with, for example, the term "suitable for", "having the capacity to", "designed to", "adapted to", "made to", or "capable of" under circumstances. The term "configured to" may not necessarily mean "specifically designed to" in hardware. Instead, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations by executing one or more software programs stored in a memory device.

Each of the components described in various embodiments of the disclosure may include one or more components, and the name of the component may vary depending on the type of an electronic device. In various embodiments, the electronic device may be configured to include at least one of the components described in this document, and may be without some components or further include additional other components. In addition, since some of the components of the electronic device according to various embodiments are combined to form a single entity, the functions of the components prior to being combined may be identically performed.

The terms as used in the disclosure are provided to describe merely specific embodiments, not intended to limit the scope of other embodiments. It is to be understood that singular forms include plural referents unless the context clearly dictates otherwise. The terms including technical or scientific terms used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the disclosure may not be interpreted as excluding embodiments of the disclosure.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device (e.g., smart glasses, a head-mounted device (HMD), electronic clothes, an electronic bracelet, an electronic necklace, electronic accessory, an electronic tattoo, a smart mirror, or a smart watch).

According to some embodiments, an electronic device may be a home appliance. The home appliance may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

According to other embodiments, an electronic device may include at least one of various medical devices including, but not limited to, various portable medical meters (a blood glucose meter, a heart rate meter, a blood pressure meter, or a body temperature meter), a magnetic resonance angiography (MRA) device, a magnetic resonance imaging (MRI) device, a computed tomography (CT) device, an imaging device, or an ultrasonic device. The electronic device may also include a navigation device, a global satellite system (GPS) receiver, an event data recorder (EDR), a flight data recorder (FDR), an automotive infotainment device, a naval electronic device (e.g., a naval navigation device, or a gyrocompass), an avionic electronic device, a security device, an in-vehicle head unit, an industrial or consumer robot, an automatic teller machine (ATM) in a financial facility, a point of sales (POS) device in a shop, or an Internet of things (IoT) device (e.g., a lighting bulb, various sensors, an electricity or gas meter, a sprinkler, a fire alarm, a thermostat, a street lamp, a toaster, sports goods, a hot water tank, a heater, or a boiler).

According to some embodiments, an electronic device may include at least one of furniture, part of a building/structure, an electronic board, an electronic signature receiving device, a projector, or various measuring devices (e.g., a water, electricity, gas or electromagnetic wave measuring device). According to various embodiments, an electronic device may be one or a combination of two or more of the foregoing devices. According to some embodiments, an electronic device may be a flexible electronic device. In addition, an electronic device, according to some embodiments of the disclosure, is not limited to the foregoing devices, and may cover a new electronic device produced along with technology development, or any other electronic device known to one of ordinary skill in the art.

FIG. 1 is a block diagram illustrating an electronic device 101 in a network environment 100, according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to some embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to some embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to some embodiments, the processor 120 may include a main processor 121 (e.g., a central processing unit (CPU) or an application processor (AP)), and/or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or may be adapted to a specified function. The auxiliary processor 123 may be implemented as separate from, or as part of the main processor 121.

The components of the electronic device 101 may have various functions or states. Furthermore, the main processor 121 may be in an active or inactive (e.g., power saving) state. In some embodiments, the auxiliary processor 123 may control at least some of these functions or states related to at least one component of the electronic device 101 (e.g., the display module 160, the sensor module 176, or the communication module 190), instead of the main processor 121 while the main processor 121 is in an inactive (e.g., sleep) state. In another example, the auxiliary processor 123 may control at least some of these functions or states related to at least one component of the electronic device together with the main processor 121 while the main processor 121 is in an active state (e.g., executing an application). According to some embodiments, the auxiliary processor 123 (e.g., an image signal processor or a communication processor) may be implemented as part of another component (e.g., the camera module 180 or the communication module 190) that is functionally related to the auxiliary processor 123.

According to some embodiments, the auxiliary processor 123 (e.g., the neural processing unit) may include a hardware structure specified for artificial intelligence model processing. An artificial intelligence model may be generated by machine learning. Such learning may be performed, for example, by the electronic device 101, where the artificial intelligence is performed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network, or a combination of two or more thereof. The artificial neural network may include any other neural network known to one of ordinary skill in the art. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from an external source (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to some embodiments, the receiver may be separate from the speaker, or integrally incorporated as part of the speaker.

The display module 160 may visually provide information to the outside (e.g., a user) of the electronic device 101. The display module 160 may include, for example, a display, a hologram device, or a projector along with associated control circuitry to control one of these devices. According to some embodiments, the display module 160 may include a touch sensor adapted to detect a touch input, or a pressure sensor adapted to measure the intensity of force incurred by the touch.

The audio module 170 may convert a sound into an electrical signal and vice versa. According to some embodiments, the audio module 170 may obtain the sound via the input module 150, or output the sound via the sound output module 155 or a headphone of an external electronic device (e.g., an electronic device 102) via a direct connection (e.g., wired) or wireless connection with the electronic device 101.

The sensor module 176 may detect an operational state (e.g., power or temperature) of the electronic device 101 or an environmental state (e.g., a state of a user) external to the electronic device 101. The sensory module 176 may subsequently generate an electrical signal or data value corresponding to the detected state. According to some embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) via a direct connection (e.g., wired) or wireless connection. According to some embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to some embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus, which may be recognized by a user via his tactile sensation or kinesthetic sensation. According to some embodiments, the haptic module 179 may include, for example, a motor, a piezoelectric element, or an electric stimulator.

The camera module 180 may capture a still image or moving images. According to some embodiments, the camera module 180 may include one or more lenses, image sensors, image signal processors, or flashes.

The power management module 188 may manage power supplied to the electronic device 101. According to some embodiments, the power management module 188 may be implemented as at least part of, for example, a power management integrated circuit (PMIC).

The battery 189 may supply power to at least one component of the electronic device 101. According to some embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108). The communication module 190 may further support performing communication via the established communication channel. The communication module 190 may include one or more communication processors that are operable independently from the processor 120 (e.g., the application processor (AP)) and support a direct (e.g., wired) communication or a wireless communication between the electronic device 101 and external electronic devices. According to some embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, for example, a high data transmission rate. The wireless communication module 192 may support various technologies for securing performance on a high-frequency band, such as, for example, beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to some embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to some embodiments, the antenna module 197 may include an antenna including a radiating element composed of a conductive material or a conductive pattern formed in or on a substrate (e.g., a printed circuit board (PCB)). According to some embodiments, the antenna module 197 may include a plurality of antennas (e.g., array antennas). For example, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. According to some embodiments, another component (e.g., a radio frequency integrated circuit (RFIC)) other than the radiating element may be additionally formed as part of the antenna module 197.

According to various embodiments, the antenna module 197 may form an mmWave antenna module. According to some embodiments, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to some embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to some embodiments, all or some of operations to be executed at the electronic device 101 may be executed at one or more of the external electronic devices 102, 104, or 108. For example, the electronic device 101 may perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform at least part of the function or a requested service, or an additional function or an additional service related to the request, and transfer one or more results of the performing to the electronic device 101. The electronic device 101 may provide the one or more results, with or without further processing of the one or more results, as at least part of a reply to the request. For example, a cloud computing, distributed computing, mobile edge computing (MEC), or client-server computing technology may be used. The electronic device 101 may provide ultra low-latency services using, for example, distributed computing or mobile edge computing. In other embodiments, the external electronic device 104 may include an IoT device. The server 108 may be an intelligent server using machine learning and/or a neural network. According to some embodiments, the external electronic device 104 or the server 108 may be included in the second network 199. The electronic device 101 may be utilized in intelligent services (e.g., smart home, smart city, smart car, or healthcare) based on 5G communication technology or IoT-related technology.

Figure 2:
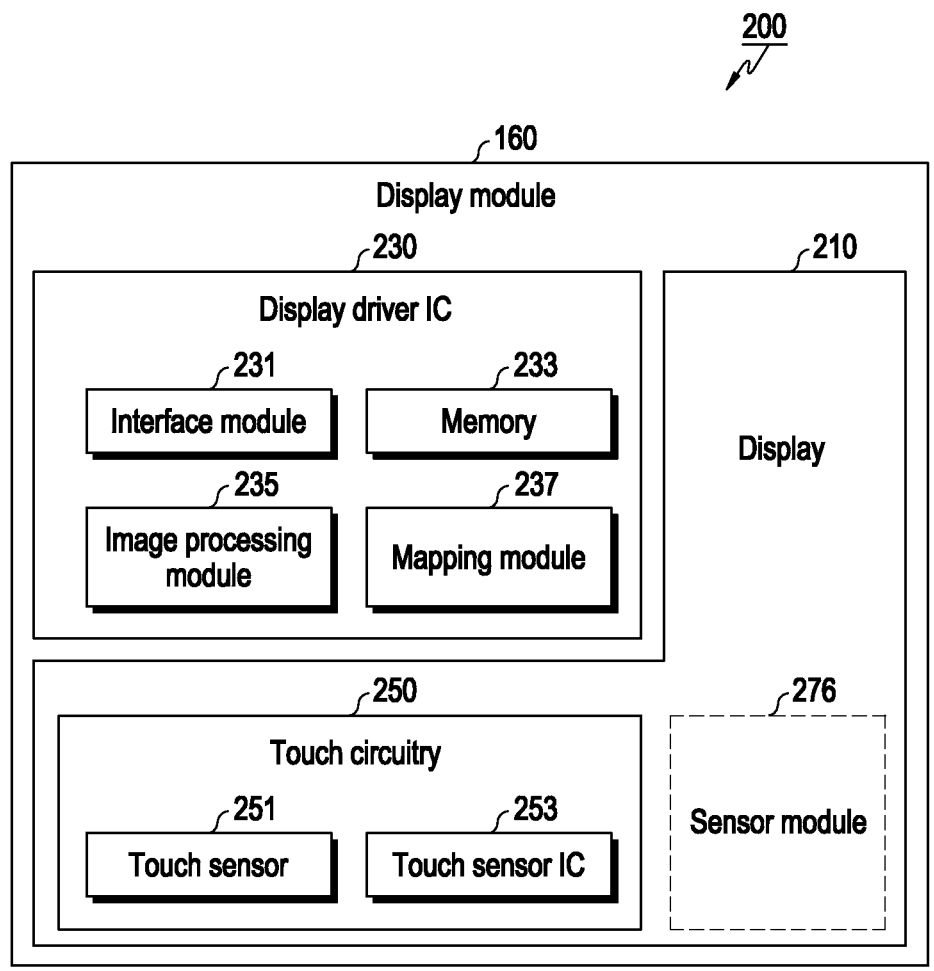
FIG. 2 is a block diagram illustrating a display device, according to various embodiments of the disclosure.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to some embodiments, the image information may be received from the processor 120 (e.g., the main processor 121, which may be an application processor) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to some embodiments, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to some embodiments, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to some embodiments, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve these features, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to some embodiments, at least part (e.g., the touch sensor IC 253) of the touch circuitry 250 may be formed as part of the display 210 or the DDI 230, or as part of another component (e.g., the auxiliary processor 123) disposed outside the display device 160.

According to some embodiments, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to some embodiments, the touch sensor 251 or the sensor module 176 may be disposed between pixels in a pixel layer of the display 210, or over or under the pixel layer.

According to various embodiments, at least part of the DDI 230 and at least part of the touch sensor IC 253 may be implemented into an integrated IC.

Figure 3A:
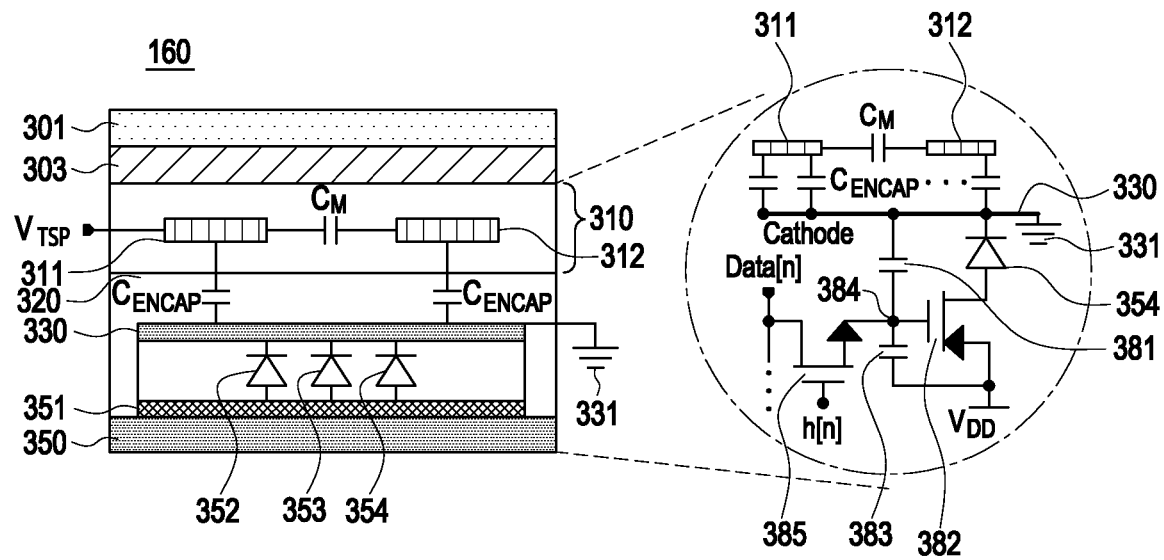
FIGS. 3A and 3B are diagrams illustrating the structure of a touch screen, according to various embodiments of the disclosure.
Figure 3B:
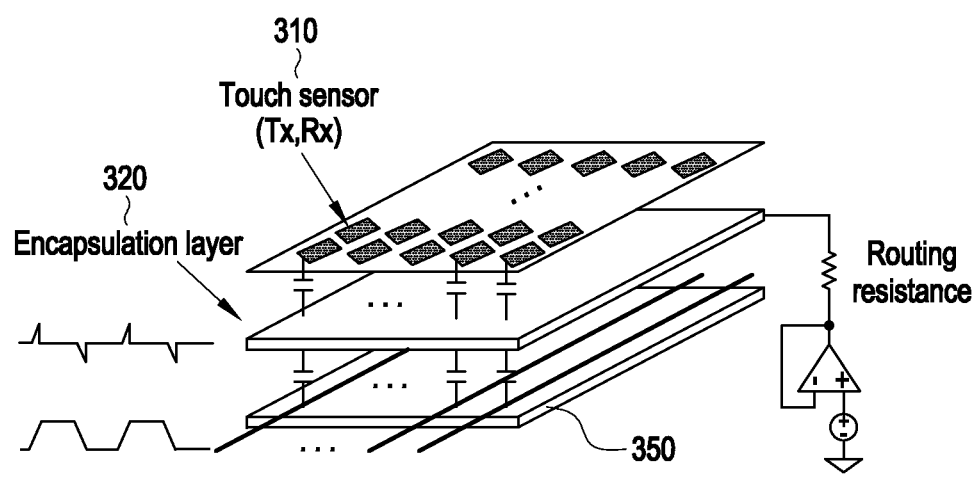

FIGS. 3A and 3B are diagrams illustrating the configuration of the display device 160 included in the electronic device 101, according to various embodiments of the disclosure.

According to various embodiments, the electronic device 101 may include the display device 160 of an on-cell structure. The display device 160 may include a window 301 to contain one or more internal elements. Although the window 301 may be formed of a substantially transparent material such as glass, the material of the window 301 is not limited to glass an may include any other suitable transparent material known to one of ordinary skill in the art. The window 301 may cover substantially the entire area of the display 210 (FIG. 2). The display device 160 may include a polarization layer 303 disposed under the window 301. The structure including the polarization layer 330 illustrated in FIGS. 3A and 3B is merely exemplary, and a pol-less structure without the polarization layer 303, to which a color filter layer (e.g., a black pixel define layer (PDL) having a polarization function) and a color filter are applied, may also be available. In various embodiments, when one component is referred to as being disposed under or on another component, those skilled in the art will understand that this structural configuration may mean that both components are placed in contact with each other or with an intermediary element in between.

According to various embodiments, a touch sensor 310 (e.g., the touch sensor 251) may be disposed under the polarization layer 303. The touch sensor 310 may include a plurality of electrodes 311 and 312. In the embodiment of FIG. 3A, the plurality of electrodes 311 and 312 are shown as two. However, this configuration is merely an example, and those skilled in the art will understand that the touch sensor 310 may include a plurality of electrodes extending in a first axial direction, a plurality of electrodes extending in a second axial direction. Furthermore, insulation material may be disposed between the plurality of electrodes extending in both directions. Although each of the electrodes 311 and 312 may be formed as, for example, a metal-mesh, the material and/or shape of the electrodes 311 and 312 is not limited to these materials, and may include any other material known to one of ordinary skill in the art. Mutual capacitance $C_M$ may be formed between the electrodes 311 and 312. In the embodiments of FIGS. 3A and 3B, a plurality of electrodes 311 and 312 are illustrated as being disposed on the same layer. However, this configuration is merely an example where in other examples, the plurality of electrodes 311 and 312 are disposed on different layers.

According to various embodiments, an encapsulation layer 320 may be disposed under the touch sensor 310. In the electronic device 101, according to various embodiments, the encapsulation layer 320 may include, for example, encapsulation glass or an encapsulation thin film. The encapsulation thin film may be formed of a flexible organic material, or any other thin film material known to one of ordinary skill in the art. For example, the encapsulation thin film may be a structure in which a plurality of organic material layers and inorganic material layers are stacked. When the encapsulation thin film is formed of a flexible organic material, the display device 160 may be flexible in a plurality of directions. A structure in which the encapsulation thin film contains a display element may be referred to as an on cell touch active-matrix organic light-emitting diode (AMOLED) (e.g., Y-OCTA). However, this configuration is merely an example, and those skilled in the art will understand that various embodiments are applicable to any touch sensor as well as the on-cell structure such as Y-OCTA.

The encapsulation layer 320 may contain a substrate 350, a thin film transistor (TFT) structure 351, a plurality of diodes 352, 353, 354, and a ground plate 330. Encapsulation capacitance $C_{ENCAP}$ may be formed between the ground plate 330 and the electrodes 311 and 312. When the encapsulation layer 320 is reduced in thickness or replaced with an encapsulation thin film, the physical distance between the electrodes 311 and 312 and the ground plate 330 may decrease, and the encapsulation capacitance may have a relatively large value.

Referring to the circuit diagram in FIG. 3A, based on a horizontal line update signal h[n] being applied to the gate of a transistor 385, data Data[n] for the display may be transmitted to a node 384 via the transistor 385. A capacitor 381, a capacitor 383, and a transistor 382 may be connected to the node 384, and a driving voltage $V_{DD}$ may be applied to the capacitor 383 and the transistor 382. The diode 354 and the capacitor 381 may be connected to the ground plate 330 connected to a ground 331. As described above, since the encapsulation capacitance $C_{ENCAP}$ is formed between the ground plate 330 and the electrodes 311 and 312, one of ordinary skill in the art would understand that the electrodes 311 and 312 and elements for the display may be connected to each other with one or more circuit elements. Accordingly, the data Data[n] for the display may be introduced to the electrodes 311 and 312 in a high period of the horizontal line update signal h[n]. This configuration may also affect the mutual capacitance $C_M$ between the electrodes 311 and 312 and/or the self-capacitance of each of the electrodes 311 and 312. Since an input position is determined according to a change in the mutual capacitance $C_M$ and/or the self-capacitance of each of the electrodes 311 and 312, the effects on the mutual capacitance $C_M$ and/or the self-capacitance of each of the electrodes 311 and 312 may cause a decrease in the accuracy of an input position measurement. Alternatively, electrical signals applied to the electrodes 311 and 312 may also be introduced to the gate of the transistor 382. For example, when the touch sensor 310 detects a user's touch input, an electrical signal applied to multiple electrodes 311 and 312 affects the ground plate 330, and a signal transmitted to the ground plate 330 may flow into the gate of the transistor 382. As the voltage of the gate is affected by this signal, the amount of light output from the diode 354 may also be affected, resulting in deterioration of image quality.

Unlike an existing display method using a single driving frequency, a display may operate by changing various driving conditions according to a screen configuration of the display. For example, the display may operate under various driving conditions such as 120 Hz constraint driving that shows games or scrolling screens smoothly without interruptions, 24 Hz driving optimized for video playback, and low-speed driving to reduce current consumption. For low-frequency driving, hybrid oxide and polycrystalline silicon (HOP) or low temperature polycrystalline oxide (LTPO) may be considered. The HOP technology may be a combination of low temperature polycrystalline silicon (LTPS) and an oxide scheme. In HOP, some transistors that may cause a leakage current in an existing LTPS OLED circuit may be changed to oxide thin film transistors (TFTs) to operate as a separate circuit.

In the circuit configuration illustrated in FIG. 3A, an operation of applying a pixel voltage to the gate node of the transistor 382 may be referred to as an address scan, and an operation of maintaining a data value loaded during a previous address scan operation without applying the pixel voltage to the gate node of the transistor 382 may be referred to a self-scan. As an example, the pixel voltage may be related to a display of an image. When the display is driven at a low frequency (e.g., 1 Hz or 10 Hz), the operation period of the address scan may be relatively long, compared to when the display is driven at a high frequency. For example, when the display is driven at a low frequency, a self-scan operation period in which data is maintained after address scan for a unit time is relatively long, and thus, image quality degradation (e.g., screen flickering or flicker) caused by the introduction of noise may be visible to a user. In particular, the flicker phenomenon is highly likely to be visible to the user in an environment with a low gray scale and a low illuminance (e.g., 100 lux). Accordingly, even when the display operates by switching to various driving conditions, it may be necessary to control driving of a touch sensor IC or a display driver IC to minimize interference between a touch sensor and a display.

Figure 4A:
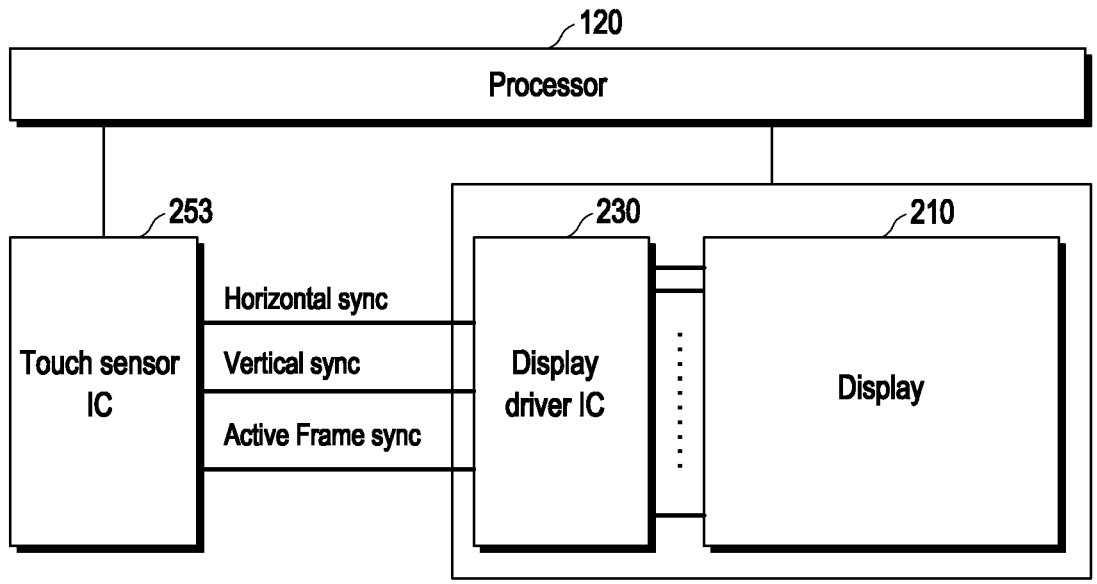
FIGS. 4A and 4B are diagrams illustrating the configuration of an electronic device, according to various embodiments of the disclosure.
Figure 4B:
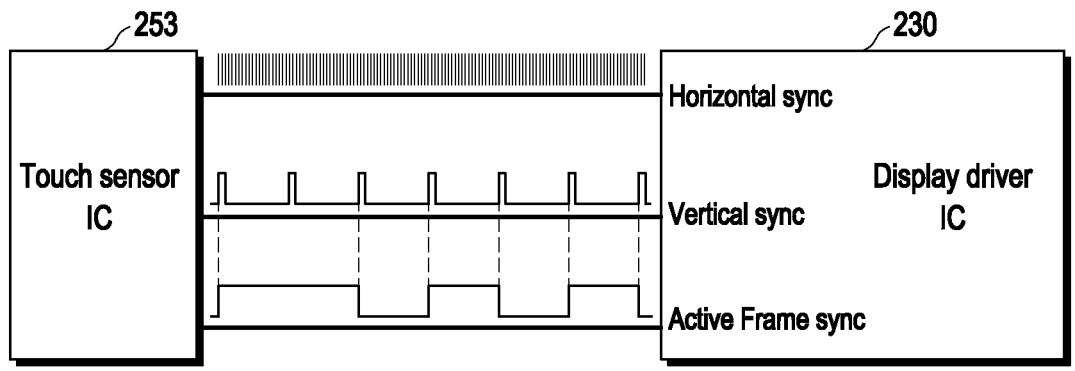
Figure 4C:
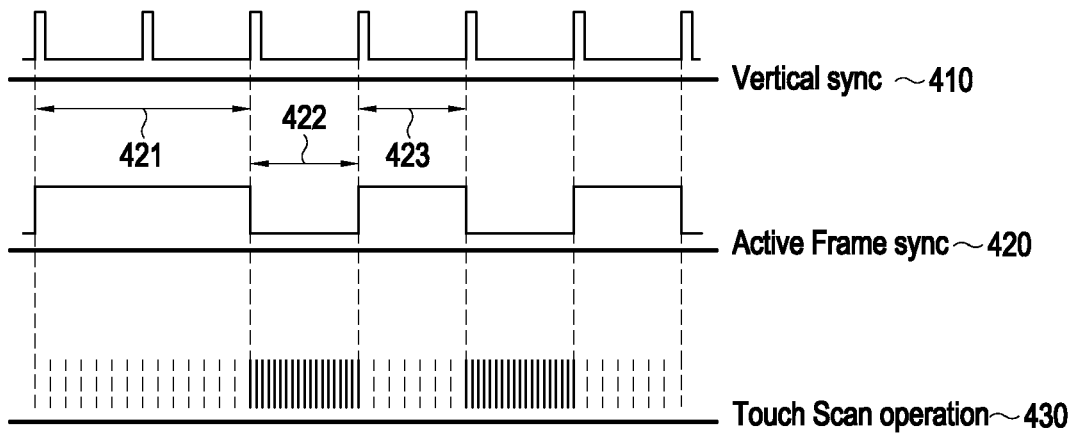
FIG. 4C is a diagram illustrating synchronized timings of a display driving signal and a touch data scan operation, according to various embodiments of the disclosure.
Figure 4D:
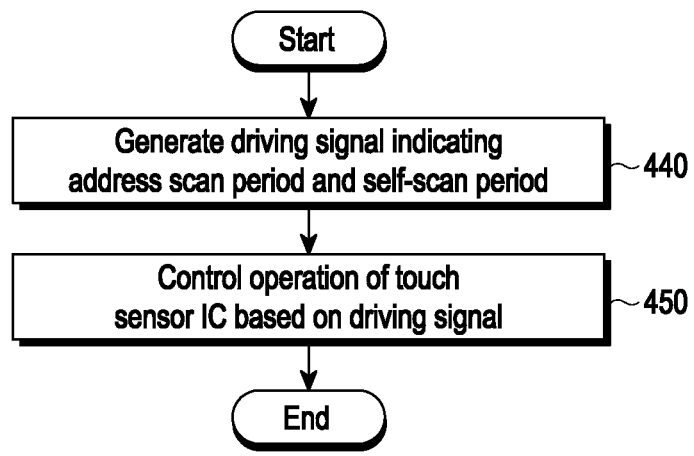
FIG. 4D is a flowchart illustrating a method of operating the electronic device, according to various embodiments of the disclosure.

FIGS. 4A and 4B are diagrams illustrating the configuration of the electronic device 101, according to various embodiments of the disclosure. FIG. 4C is a diagram illustrating synchronized timings of a display driving signal and a touch data scan operation, according to various embodiments of the disclosure. FIG. 4D is a flowchart illustrating a method of operating an electronic device, according to various embodiments of the disclosure.

Referring to FIG. 4A, the electronic device 101 may include the processor 120 (FIG. 1), the touch sensor IC 253, the display driver IC 230, or the display 210 (FIG. 2). The display driver IC 230 may control the display 210 to display image data received from another component (e.g., the memory 130 of FIG. 1) of the electronic device 101 through the display 210. The touch sensor IC 253 may control at least one touch sensor to sense touch data inputted to the at least one touch sensor. According to various embodiments of the disclosure, the processor 120 may be electrically connected to the touch sensor IC 253, the display driver IC 230, or the display 210 to control their operations. For example, the processor 120 may set a display driving condition such as frame change information or display driving frequency information and transmit the display driving condition to the display driver IC 230.

In FIG. 4B, the display driver IC 230 may transmit at least one driving signal for driving the display to the touch sensor IC 253 to share a display driving condition with the touch sensor IC 253. The display driver IC 230 may receive the display driving condition from a processor (e.g., the processor 120 of FIG. 1 or FIG. 4A) or autonomously set the display driving condition. For example, the display driver IC 230 may transmit a horizontal synchronization signal, a vertical synchronization signal, or an active frame synchronization signal to the touch sensor IC 253. The horizontal synchronization signal may be a signal defining a period in which data is recorded to pixels forming one horizontal line (1H time) of a display panel, and the vertical synchronization signal may be a signal defining a period in which change information is recorded on a frame basis on the display panel. The vertical synchronization signal may be an example of a first touch driving signal. The active frame synchronization signal may be a signal indicating an actual image loading period on a frame basis. The active frame synchronization signal may be independent of the horizontal synchronization signal and the vertical synchronization signal. The active frame synchronization signal may be an example of a second touch driving signal.

For example, when a currently displayed frame image is changed from a previous frame image in the process of displaying one frame, the display may perform an operation of loading a data value to be changed and displayed (e.g., address scan) and an operation of maintaining the loaded data (e.g., self-scan). The active frame synchronization signal may be a signal indicating a time period in which the address operation and the self-scan operation are performed. According to various embodiments, the touch sensor IC 253 may receive the horizontal synchronization signal and the vertical synchronization signal from the display driver IC 230. The touch sensor IC 253 may determine a touch sensing period by using the received horizontal synchronization signal and vertical synchronization signal. For example, the touch sensor IC 253 may determine the touch sensing period such that a touch input may be sensed during a time period in which the horizontal synchronization signal and the vertical synchronization signal do not overlap with each other.

According to various embodiments of the disclosure, the touch sensor IC 253 may control an operation of scanning touch data based on a vertical synchronization signal 410 or an active frame synchronization signal 420 among at least one driving signal received from the display driver IC 230, which is described in further with respect to FIG. 4C.

According to various embodiments of the disclosure, when an image is changed on a frame basis as the active frame synchronization signal 420 based on the vertical synchronization signal 410, the display driver IC 230 may configure a period in which image data of the display is updated, and transmit the active frame synchronization signal 420 to the touch sensor IC 253. For example, during loading of an image on a frame basis according to the vertical synchronization signal 410, the display driver IC 230 may configure the active frame synchronization signal 420 such that an address scan period in which image data is updated and a self-scan period in which previously loaded image data is maintained are distinguishable from each other. As an example, during the address scan period, a voltage may be applied to a pixel of a display to load image data, and during the self-scan period, the loaded data is maintained without applying the voltage. In the active frame synchronization signal 420, the address scan period and the self-scan period may be classified as a high level and a low level, respectively. The touch sensor IC 253 may change a driving frequency for scanning touch data or discontinue an operation of scanning touch data so as to minimize the influence on the display in periods 421 and 423 in which the active frame synchronization signal 420 is at a high level. In a period 422 in which the active frame synchronization signal 420 is at a low level, the display may be relatively less affected by a touch input, and thus the touch sensor IC 253 may set a driving frequency for scanning touch data to be relatively high. In a touch scan operation 430 of FIG. 4C, dotted lines are drawn in the address scan periods, for example, to indicate that the touch sensor IC 253 discontinues touch driving. However, this configuration is merely exemplary, and as described above, the touch sensor IC 253 may be implemented to set the driving frequency to be higher than the driving frequency of the self-scan period.

FIG. 4D is a flowchart illustrating a method of operating the electronic device 101, according to various embodiments of the disclosure. According to some embodiments, the electronic device 101 may control an operation of scanning touch data based on a driving signal (e.g., the active frame synchronization signal of the display). The operations of FIG. 4D may be performed by the display driver IC 230 or the touch sensor IC 253 included in the electronic device 101.

In operation 440, the display driver IC 230 may determine an address scan period in which information for a display update is recorded or a self-scan period in which the recorded information is maintained, and generate a driving signal indicating the address scan period or the self-scan period. For example, the display driver IC 230 may generate the driving signal such that a high level of the driving signals is applied in correspondence with the address scan period, and a low level of the driving signal is applied in correspondence with the self-scan period.

In operation 450, the touch sensor IC 253 may control an operation of scanning touch data based on the driving signal. The touch sensor IC 253 may change a scan period of the touch data in response to a level change of the driving signal. For example, when the touch sensor IC 253 detects a high level while receiving the driving signal, the touch sensor IC 253 may determine an address scan period, and control the operation of scanning to scan the touch data with a periodicity greater than a reference time length during the high-level time period or to discontinue scanning of the touch data. In operation 450, when the touch sensor IC 253 detects a low level while receiving the driving signal, the touch sensor IC 253 may determine a self-scan period, and control the operation of scanning to scan the touch data with a periodicity less than the reference time length during the low-level time period.

Figure 5A:
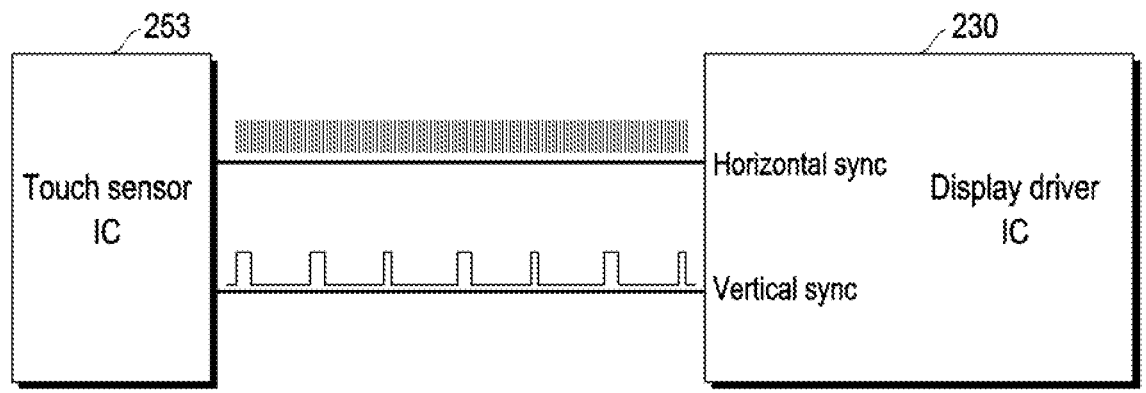
FIG. 5A is a diagram illustrating the configuration of at least part of an electronic device, according to various embodiments of the disclosure.
Figure 5B:
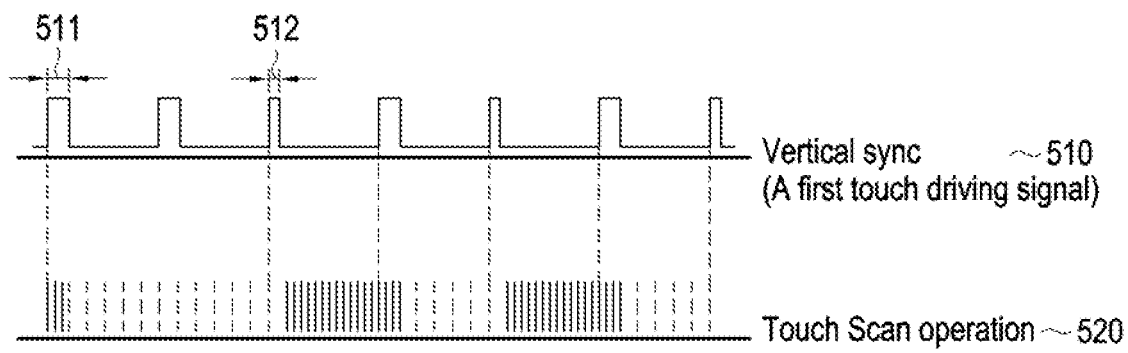
FIG. 5B is a diagram illustrating a schedule of a touch data scan operation, according to various embodiments of the disclosure.

FIG. 5A is a diagram illustrating the configuration of at least part of the electronic device 101, according to various embodiments of the disclosure, and FIG. 5B is a diagram illustrating a schedule of a touch data scan operation, according to various embodiments of the disclosure.

Referring to FIG. 5A, the electronic device 101 may include the touch sensor IC 253 and the display driver IC 230. To share a display driving condition with the touch sensor IC 253, the display driver IC 230 may transmit at least one driving signal, for driving the display, to the touch sensor IC 253. According to various embodiments of the disclosure, when the display driver IC 230 obtains information for a display update, the display driver IC 230 may use pulses of a first driving signal to transmit an address scan period in which the information is recorded and a self-scan period in which the recorded information is maintained to the touch sensor IC 253. For example, the display driver IC 230 may apply a first pulse for the address scan period and apply a second pulse for the self-scan period. The first pulse and the second pulse may be distinguished from each other by pulse widths. The first driving signal may be a vertical synchronization signal for the display.

According to various embodiments of the disclosure, the touch sensor IC 253 may control an operation of scanning touch data based on the width of a pulse detected while receiving the first driving signal from the display driver IC 230. For example, upon detection of the first pulse having a first pulse width while receiving the first driving signal, the touch sensor IC 253 may perform a first operation corresponding to the address scan period. The first operation may be an operation performed by the touch sensor IC 253 of scanning touch data with a first periodicity greater than a reference time length. As another example, the first operation may be an operation performed by the touch sensor IC 253 of discontinuing the scanning of the touch data. According to various embodiments of the disclosure, upon detection of the second pulse having a second pulse width, the touch sensor IC 253 may perform a second operation corresponding to the self-scan period. The second operation may be an operation of scanning touch data with a second periodicity less than the reference time length by the touch sensor IC 253. When determining that the pulse of the first driving signal is changed from the first pulse to the second pulse, the touch sensor IC 253 may change the scan periodicity of the touch data from the first periodicity to the second periodicity. Similarly, when determining that the pulse of the first driving signal is changed back to the first pulse, the touch sensor IC 253 may control a scanning operation to change the scan periodicity of touch data from the second periodicity to the first periodicity. The touch sensor IC 253 may also control the scanning operation to stop the scanning of the touch data.

FIG. 5B illustrates a schedule 520 of scanning touch data based on a first driving signal 510 received from the display driver IC 230. For example, upon detection of a first pulse having a first pulse width 511 while the first driving signal 510 is being provided, the touch sensor IC 253 may determine an address scan period in which information for a display update is recorded, and change a driving frequency for scanning touch data through processing such as frequency hopping during the address scan period. The touch sensor IC 253 may also stop the scanning of the touch data during the address scan period. In another example, upon detection of a second pulse having a second pulse width 512 while the first driving signal 510 is being provided, the touch sensor IC 253 may determine a self-scan period in which the display driver IC 230 displays previously recorded information, while maintaining the information. Because the display is less affected by a touch input during the self-scan period compared to an address scan period, the touch sensor IC 253 may scan touch data at a relatively high driving frequency without changing the driving frequency for scanning touch data.

When the address scan period or the self-scan period of the display driver IC 230 is determined using the pulse width of the first driving signal 510 (e.g., a vertical synchronization signal) as illustrated in FIG. 5B, the touch sensor IC 253 may not be capable of detecting the pulse width at a time when the pulse is generated. Therefore, the touch sensor IC 253 may have difficulty in directly changing the driving frequency for scanning touch data in response to the first driving signal. Since the touch sensor IC 253 may change the driving frequency after recognizing the first pulse width 511 or the second pulse width 512, there may be some delay between a time of changing the pulse width of the first driving signal and a time of changing a touch driving frequency.

Figure 6:
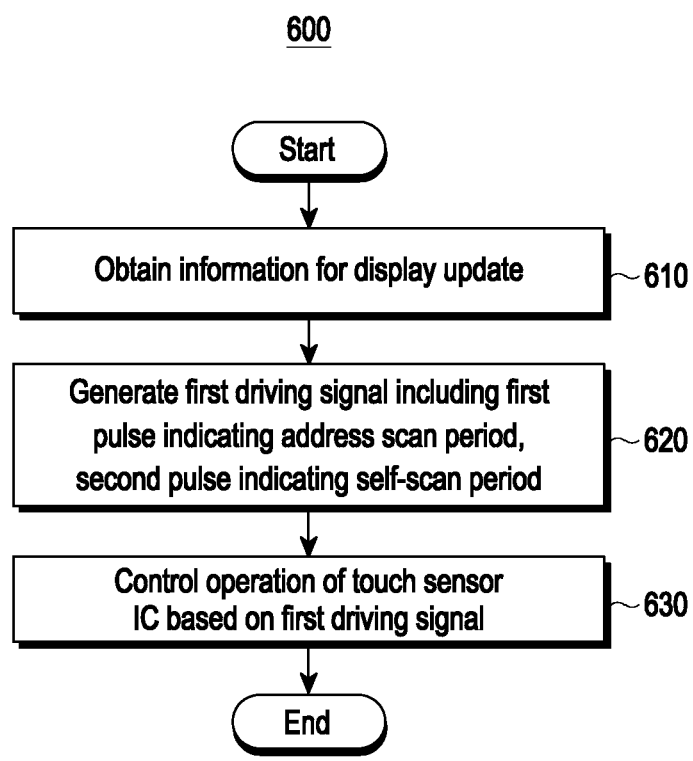
FIG. 6 is a flowchart illustrating a method of operating an electronic device, according to various embodiments of the disclosure.

FIG. 6 is a flowchart 600 illustrating a method of operating the electronic device 101, according to various embodiments of the disclosure. According to some embodiments, the electronic device 101 may control an operation of scanning touch data based on a first driving signal (e.g., a vertical synchronization signal or a horizontal synchronization signal of the display). The operations of FIG. 6 may be performed by the display driver IC 230 or the touch sensor IC 253 included in the electronic device 101.

Referring to FIG. 6, the display driver IC 230 may obtain information for a display update in operation 610.

In operation 620, the display driver IC 230 may generate a first driving signal including a first pulse indicating an address scan period in which the information is recorded and a second pulse indicating a self-scan period in which the recorded information is maintained. The first pulse and the second pulse may be distinguished from each other by respective pulse widths of these pulses. For example, the display driver IC 230 may generate the first driving signal such that the first pulse having a first pulse width is applied during the address scan period, and the second pulse having a second pulse width is applied during the self-scan period. The display driver IC 230 may transmit the generated first driving signal to the touch sensor IC 253.

In operation 630, the touch sensor IC 253 may control an operation of scanning touch data based on the first driving signal. For example, upon detection of the first pulse width while receiving the first driving signal, the touch sensor IC 253 may determine the address scan period and perform a first operation. The first operation may be an operation of scanning touch data with a first periodicity greater than a reference time length by the touch sensor IC 253, or an operation of discontinuing the scanning of the touch data by the touch sensor IC 253. In another example, upon detection of the second pulse having a second pulse width while receiving the first driving signal, the touch sensor IC 253 may determine the self-scan period and perform a second operation. The second operation may be an operation of scanning touch data with a second periodicity less than the reference time length by the touch sensor IC 253. According to various embodiments of the disclosure, when determining that the pulse width of an applied pulse is changed while the first driving signal is being provided, the touch sensor IC 253 may change the scan periodicity of the touch data. When the pulse of the first driving signal is changed from the first pulse to the second pulse, the touch sensor IC 253 may change the scan periodicity of touch data from the first periodicity to the second periodicity. When the pulse of the first driving signal is changed back to the first pulse, the touch sensor IC 253 may change the scan periodicity of touch data from the second periodicity to the first periodicity, or control a scanning operation to stop the scanning of the touch data.

Figure 7A:
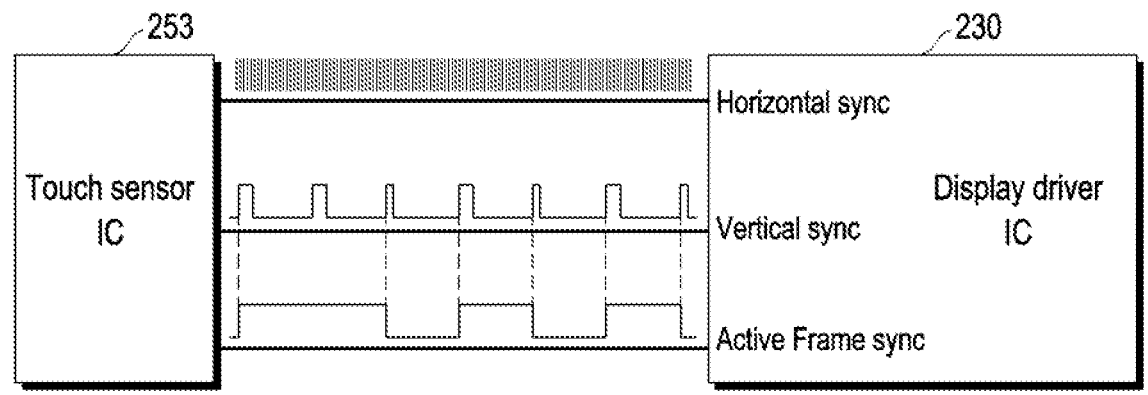
FIG. 7A is a diagram illustrating the configuration of at least part of an electronic device, according to various embodiments of the disclosure.
Figure 7B:
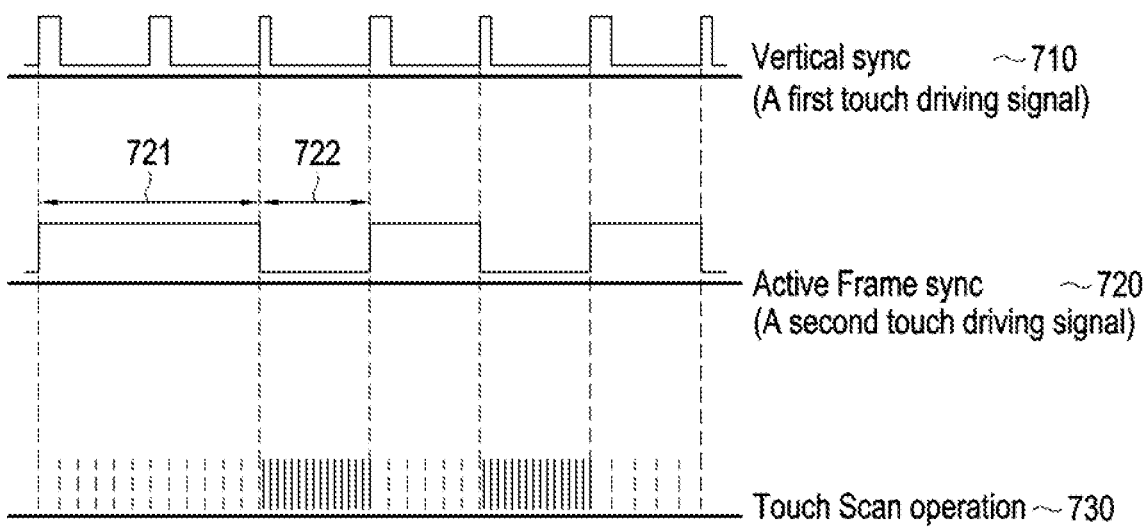
FIG. 7B is a diagram illustrating a schedule of a touch data scan operation, according to various embodiments of the disclosure.

FIG. 7A illustrates the configuration of at least a portion of the electronic device 101, according to various embodiments of the disclosure, and FIG. 7B is a diagram for describing a schedule of a touch data scan operation, according to various embodiments of the disclosure.

Referring to FIG. 7A, the electronic device 101 may include the touch sensor IC 253 and the display driver IC 230. The display driver IC 230 may transmit at least one driving signal for driving the display to the touch sensor IC 253 to share a display driving condition with the touch sensor IC 253. According to various embodiments of the disclosure, when the display driver IC 230 obtains information for a display update, the display driver IC 230 may determine an address scan period in which the information is recorded or a self-scan period in which the previously recorded information is displayed while maintaining the information, based on a first driving signal. The first driving signal may be a vertical synchronization signal defining a period in which change information is recorded on a frame basis on the display. As understood by one of ordinary skill in the art, the horizontal synchronization signal may be used to define the period in which the change information is recorded. According to various embodiments of the disclosure, the first driving signal may include a first pulse related to the address scan period and a second pulse related to the self-scan period, and the first pulse and the second pulse may have different pulse widths. The display driver IC 230 may generate a second driving signal indicating the determined address scan period and the determined self-scan period based on the first driving signal, and provide the generated second driving signal to the touch sensor IC 253. For example, the display driver IC 230 may generate the second driving signal such that a high level of the second driving signal is applied in response to generation of the first pulse in the first driving signal and a low level of the second driving signal is applied in response to generation of the second pulse in the first driving signal. The display driver IC 230 may be configured to change the level of the second driving signal in synchronization with a rising edge of a pulse changed in the first driving signal in order to indicate the address scan period and the self-scan period in response to a pulse change timing of the first driving signal. In the second driving signal, the address scan period may correspond to a period from a time of generating the first pulse to a time of generating the second pulse in the first driving signal, and the self-scan period may correspond to a period from a time of generating the second pulse to a time of generating the first pulse in the first driving signal.

According to various embodiments of the disclosure, the touch sensor IC 253 may control an operation of scanning touch data based on a signal level detected while receiving the second driving signal from the display driver IC 230. For example, upon detection of the high level while receiving the second driving signal, the touch sensor IC 253 may perform a first operation corresponding to the address scan period. The first operation may be an operation performed by the touch sensor IC 253 of scanning touch data with a first periodicity greater than a reference time length. The first operation may also be an operation of discontinuing the scanning of the touch data by the touch sensor IC 253. According to various embodiments of the disclosure, upon detection of the low level while receiving the second driving signal, the touch sensor IC 253 may perform a second operation corresponding to the self-scan period. The second operation may be an operation of scanning touch data performed by the touch sensor IC 253, with a second periodicity less than the reference time length. When determining that the level of the second driving signal is changed from high to low, the touch sensor IC 253 may change the scan periodicity of touch data from the first periodicity to the second periodicity. Similarly, when determining that the level of the second driving signal is changed to high again, the touch sensor IC 253 may control a scanning operation to change the scan periodicity of touch data from the second periodicity to the first periodicity or to discontinue the scanning of the touch data.

FIG. 7B illustrates a schedule 730 in which the touch sensor IC 253 performs a touch data scan based on a first driving signal 710 or a second driving signal 720 received from the display driver IC 230. For example, in a period 721 in which the second driving signal 720 is at a high level, the touch sensor IC 253 may determine an address scan period in which information for a display update is recorded, and change a driving frequency for scanning touch data through processing (e.g., frequency hopping) or discontinue the scanning of the touch data. In a period 722 in which the second driving signal 720 is at a low level, the touch sensor IC 253 may determine a self-scan period in which the display driver IC 230 displays previously recorded information while maintaining the previously recorded information, and perform a touch data scan on the touch data at a relatively high driving frequency without changing the driving frequency for scanning touch data.

As illustrated in FIG. 7B, when the address scan period or the self-scan period of the display driver IC 230 is determined by the level of the second driving signal 720 (e.g., an active frame synchronization signal), the touch sensor IC 253 may change the driving frequency by immediately detecting a timing of a signal level change, and thus, the delay as illustrated in FIG. 5B may not occur. In another example, the touch sensor IC 253 may only determine the address scan period or the self-scan period of the display by the second driving signal 720, without determining the driving frequency of the display. The touch sensor IC 253 may select filter information to be applied for correction of touch data in correspondence with the driving frequency of the display, and obtain information about the driving frequency of the display from the first driving signal 710 (e.g., a vertical synchronization signal).

According to various embodiments of the disclosure, the display driver IC 230 may predetermine a clock cycle corresponding to the driving frequency of the display. For example, a clock cycle corresponding to each driving frequency may be defined, such as 1 clock cycle for a display driving frequency of 120 Hz, 5 clock cycles for a display driving frequency of 60 Hz, and 20 clock cycles for a display driving frequency of 1 Hz. The display driver IC 230 may generate a first pulse of a first driving signal 710 according to the defined clock cycle corresponding to each of the driving frequencies. The display driver IC 230 may apply the first pulse to the first driving signal 710 every clock cycle in correspondence with the driving frequency of 120 Hz, and every five clock cycles in correspondence with the driving frequency of 60 Hz. Accordingly, the touch sensor IC 253 may determine the driving frequency of the display based on a clock cycle in which the first pulse is generated in the first driving signal 710, and select and apply a filter corresponding to the determined driving frequency of the display. Since the touch sensor IC 253 may determine the driving frequency of the display through the first driving signal 710 and determine a period in which information for a display update is recorded through the second driving signal 720, the touch sensor IC 253 may control driving of the touch sensor, while advantageously minimizing the influence on driving of the display.

Figure 8:
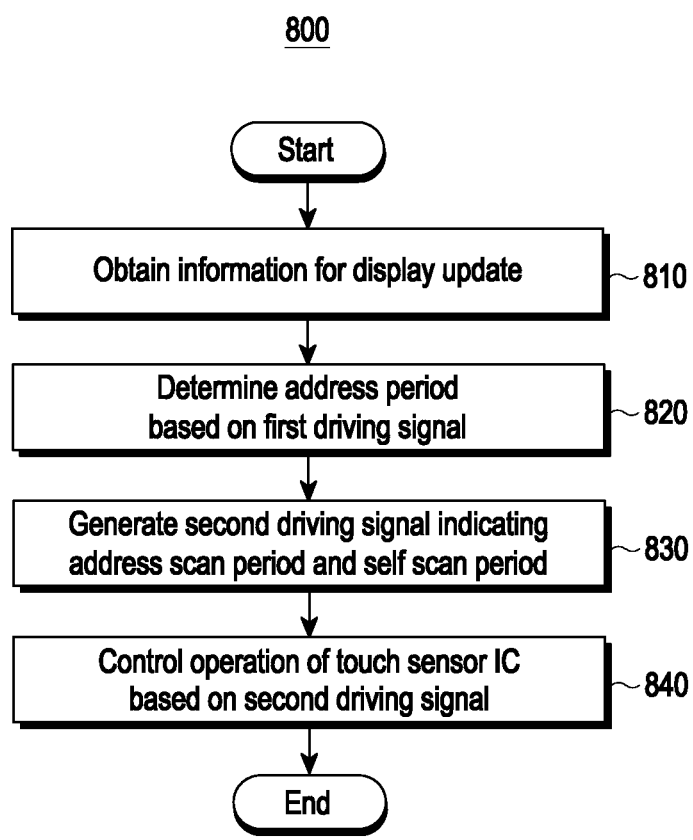
FIG. 8 is a flowchart illustrating a method of operating an electronic device, according to various embodiments of the disclosure.

FIG. 8 is a flowchart 800 illustrating a method of operating the electronic device 101 according to various embodiments of the disclosure. According to some embodiments, the electronic device 101 may control an operation of scanning touch data based on a first driving signal (e.g., a vertical synchronization signal of the display) or a second driving signal (e.g., an active frame synchronization signal of the display). The operations of FIG. 8 may be performed by the display driver IC 230 or the touch sensor IC 253 included in the electronic device 101.

Referring to FIG. 8, the display driver IC 230 may obtain information for a display update in operation 810.

In operation 820, the display driver IC 230 may determine an address scan period in which information is recorded or a self-scan period in which the recorded information is maintained, based on the first driving signal. According to various embodiments of the disclosure, the first driving signal may include a first pulse related to the address scan period and a second pulse related to the self-scan period, and the first pulse and the second pulse may have different pulse widths.

In operation 830, the display driver IC 230 may generate a second driving signal indicating the determined address scan period and the determined self-scan period based on the first driving signal. For example, the display driver IC 230 may generate the second driving signal such that a high level of the second driving signal is applied in response to generation of the first pulse in the first driving signal, and a low level of the second driving signal is applied in response to generation of the second pulse in the first driving signal. The level of the second driving signal may be changed in synchronization with a pulse change timing of the first driving signal. In the second driving signal, the address scan period may correspond to a period from a time of generating the first pulse to a time of generating the second pulse in the first driving signal, and the self-scan period may corresponding to a period from a time of generating the second pulse to a time of generating the first pulse in the first driving signal. The display driver IC 230 may transmit the generated second driving signal to the touch sensor IC 253.

In operation 840, the touch sensor IC 253 may control an operation of scanning touch data based on the second driving signal. The touch sensor IC 253 may change a scan periodicity of the touch data in response to a level change of the second driving signal. For example, upon detecting a high level while receiving the second driving signal, the touch sensor IC 253 may determine the address scan period and perform a first operation. The first operation may be an operation performed by the touch sensor IC 253 of scanning touch data with a first periodicity greater than a reference time length. The firs operation may also be an operation performed by the touch sensor IC 253 of discontinuing the scanning of the touch data. In operation 840, upon detecting a low level while receiving the second driving signal, the touch sensor IC 253 may determine the self-scan period and perform a second operation. The second operation may be an operation performed by the touch sensor IC 253 of scanning touch data with a second periodicity less than the reference time length.

The display driver IC 230 may inform the touch sensor IC 253 of only the address scan period or the self-scan period of the display through the second driving signal, instead of information about the driving frequency of the display. Since the touch sensor IC 253 may select filter information for correction of touch data in correspondence with the driving frequency of the display, it may be important for the touch sensor IC 253 to determine the driving frequency of the display in an environment with various driving conditions of the display. Accordingly, in operation 830, the display driver IC 230 may transmit the first driving signal together with the second driving signal to the touch sensor IC 253 to indicate the driving frequency of the display. According to various embodiments of the disclosure, the display driver IC 230 may define a clock cycle corresponding to each display driving frequency, and generate the first pulse of the first driving signal according to the defined clock cycle corresponding to each driving frequency. For example, the display driver IC 230 may define a clock cycle corresponding to each driving frequency, such as 1 clock cycle for a display driving frequency of 120 Hz and 20 clock cycles for a display driving frequency of 1 Hz. The display driver IC 230 may further apply the first pulse to the first driving signal every clock cycle for the driving frequency of 120 Hz and every 20 clock cycles for the driving frequency of 1 Hz. Accordingly, while receiving the first driving signal from the display driver IC 230, the touch sensor IC 253 may determine the driving frequency of the display based on a clock cycle in which the first pulse is detected. The touch sensor IC 253 may further adjust a filter for correction of touch data in correspondence with the determined driving frequency of the display in operation 840.

Figure 9:
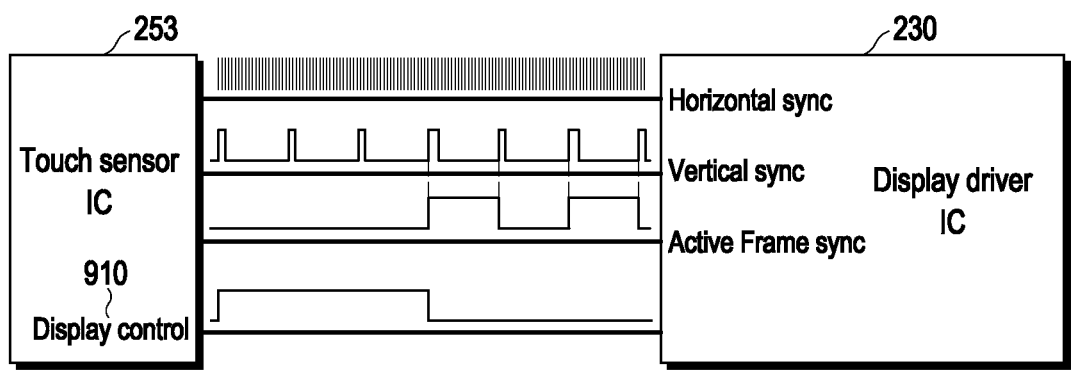
FIG. 9 is a diagram illustrating the configuration of at least part of an electronic device, according to various embodiments of the disclosure.

FIG. 9 is a diagram illustrating the configuration of at least part of the electronic device 101, according to various embodiments of the disclosure.

Referring to FIG. 9, the electronic device 101 may include the touch sensor IC 253 and the display driver IC 230. The touch sensor IC 253 may transmit at least one driving signal for driving the touch sensor to the display driver IC 230 to share a touch driving condition with the display driver IC 253. According to various embodiments of the disclosure, the touch sensor IC 253 may determine a noise level from at least one touch sensor, and generate a third driving signal 910 for controlling the display driver IC 230 in correspondence with the determined noise level. The noise level may be related to a wireless charging state of the electronic device 101. For example, the touch sensor IC 253 may generate the third driving signal 910 such that when it is determined that the noise level is equal to or greater than a threshold level, a high level of the driving signal is applied, whereas when it is determined that the noise level is lower than the threshold level, a low level of the driving signal is applied. According to various embodiments of the disclosure, when determining that touch performance should be maintained according to an application currently running on the electronic device 101 or a user setting, the touch sensor IC 253 may set the third driving signal 910 to indicate a low level. For example, when a touch sensitivity is set to a high level, which may occur when a protective cover is mounted on the display surface of the electronic device 101 or a glove mode is set, the existing driving frequency of the display may be maintained to prevent touch malfunction. Even when proximity is sensed from touch hovering due to application or deletion of a proximity sensor disposed on the rear surface of the display during a call, the level of the third driving signal 910 may be set to a low level to prevent the degradation of touch performance.

According to various embodiments of the disclosure, the display driver IC 230 may control a driving condition of the display based on a signal level detected while receiving the third driving signal 910 from the touch sensor IC 253. For example, upon detection of a high level while receiving the third driving signal 910, the display driver IC 230 may determine a period in which the display may be affected by driving of the touch sensor IC 253, and perform a third operation. The third operation may be an operation of maintaining a previously set driving frequency without changing the driving frequency of the display by the display driver IC 230 during a period in which the third driving signal 910 is maintained at the high level. According to some embodiments, the display driver IC 230 may perform the third operation by limiting the driving of the display to or below a specified driving frequency to prevent malfunction of the touch sensor during the period in which the third driving signal 910 is maintained at the high level. Since the display may not be affected by the driving of the touch sensor IC 253 during a period in which the third driving signal 910 is at the low level, the display driver IC 230 may change the driving condition of the display according to the characteristics of an image. For example, the characteristics of the image may correspond to a brightness level of the image or any other image property that affects the display of the image.

Figure 10:
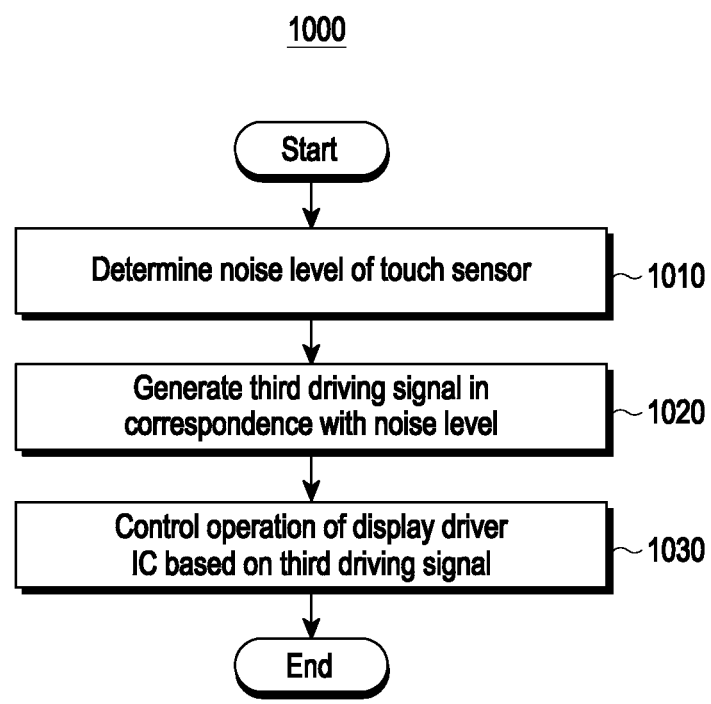
FIG. 10 is a flowchart illustrating a method of operating an electronic device, according to various embodiments of the disclosure.

FIG. 10 is a flowchart 1000 illustrating a method of operating the electronic device 101 according to various embodiments of the disclosure. According to some embodiments, the electronic device 101 may control driving of the display based on a third driving signal (e.g., a display control signal). The operations of FIG. 8 may be performed by the display driver IC 230 or the touch sensor IC 253 included in the electronic device 101.

Referring to FIG. 10, the touch sensor IC 253 may determine a noise level from the touch sensor by driving at least one sensing channel in operation 1010.

In operation 1020, the touch sensor IC 253 may generate the third driving signal 910 for controlling the display driver IC 230 in correspondence with the determined noise level. In operation 1020, when determining that the noise level is equal to or greater than a specified threshold level, the touch sensor IC 253 may set the level of the third driving signal to a high level, and when determining that the noise level is less than the threshold level, the touch sensor IC 253 may set the level of the third driving signal to a low level. The touch sensor IC 253 may transmit the generated third driving signal to the display driver IC 230.

In operation 1030, the display driver IC 230 may control a driving condition of the display based on the third driving signal. According to various embodiments of the disclosure, upon detection of a high level while receiving the third driving signal 910, the display driver IC 230 may determine a period in which the noise level of the touch sensor is high and perform a third operation. The third operation may be an operation of maintaining a previously set driving frequency without changing the driving frequency of the display by the display driver IC 230 during a period in which the third driving signal 910 is maintained at the high level, or an operation of limiting the driving of the display to or below a specified driving frequency to prevent malfunction of the touch sensor.

The display driver IC 230 may detect and avoid noise interference that may occur between the touch sensor and the display and further prevent deterioration of display quality, by controlling the driving condition of the display in consideration of a noise level in the touch sensor.

According to various embodiments of the disclosure, the electronic device 101 may include the touch sensor IC 253 and the display driver IC 230. The display driver IC 230 may be configured to obtain information for a display update, and provide a first driving signal including a first pulse indicating an address scan period in which the information is recorded and a second pulse indicating a self-scan period in which the recorded information is maintained to the touch sensor IC 253. While the first driving signal is provided from the display driver IC 230, the touch sensor IC 253 may be configured to perform a first operation based on detection of the first pulse. While the first driving signal is provided from the display driver IC 230, the touch sensor IC 253 may be configured to perform a second operation based on detection of the second pulse.

According to various embodiments of the disclosure, the first driving signal may include a vertical synchronization signal of the display driver IC 230.

According to various embodiments of the disclosure, the first operation may be an operation of, when the first pulse is detected while the first driving signal is provided, causing the touch sensor IC 253 to scan touch data inputted through at least one touch sensor with a first periodicity.

According to various embodiments of the disclosure, the first operation may be an operation of, when the first pulse is detected while the first driving signal is provided, causing the touch sensor IC 253 to discontinue scanning of touch data inputted through at least one touch sensor.

According to various embodiments of the disclosure, the second operation may be an operation of, when the second pulse is detected while the first driving signal is provided, causing the touch sensor IC 253 to scan touch data inputted through at least one touch sensor with a second periodicity different from the first periodicity.

According to various embodiments of the disclosure, the touch sensor IC 253 may be configured to change a scan periodicity of the touch data in response to determining that the first pulse is changed to the second pulse while the first driving signal is provided.

According to various embodiments of the disclosure, the electronic device 101 may include the touch sensor IC 253 and the display driver IC 230. The display driver IC 230 may be configured to obtain information for a display update, determine an address scan period in which the information is recorded based on a first driving signal, and provide a second driving signal indicating the address scan period and a self-scan period in which the recorded information is maintained to the touch sensor IC 253. The touch sensor IC 253 may be configured to perform a first operation in correspondence with the address scan period of the second driving signal, and perform a second operation in correspondence with the self-scan period of the second driving signal.

According to various embodiments of the disclosure, the first driving signal may include at least one of a first pulse related to the address scan period and a second pulse related to the self-scan period.

According to various embodiments of the disclosure, the display driver IC 230 may generate the second drive signal to indicate the address scan period or the self-scan period in correspondence with a pulse change timing of the first driving signal.

According to various embodiments of the disclosure, the address scan period of the second driving signal may correspond to a period from a first pulse generation time to a second pulse generation time of the first driving signal (e.g., a period from a time of generating a first pulse to a time of generating a second pulse of the first driving signal).

According to various embodiments of the disclosure, the self-scan period of the second driving signal may correspond to a period from a second pulse generation time to a first pulse generation time of the first driving signal (e.g., a period from a time of generating a second pulse to a time of generating a first pulse of the driving signal).

According to various embodiments of the disclosure, the first operation may be an operation of causing the touch sensor IC 253 to scan touch data inputted through at least one touch sensor with a first periodicity during the address scan period of the second driving signal.

According to various embodiments of the disclosure, the first operation may be an operation of causing the touch sensor IC to discontinue scanning of touch data inputted through at least one touch sensor during the address scan period of the second driving signal.

According to various embodiments of the disclosure, the second operation may be an operation of causing the touch sensor IC to scan touch data inputted through at least one touch sensor with a second periodicity different from the first periodicity during the self-scan period of the second driving signal.

According to various embodiments of the disclosure, the touch sensor IC 253 may be configured to change a scan periodicity of the touch data in response to a level change of the second driving signal.

According to various embodiments of the disclosure, the display driver IC 230 may determine a clock cycle corresponding to a display driving frequency, and, while providing the first driving signal, generate the first pulse according to the clock cycle.

According to various embodiments of the disclosure, the touch sensor IC 253 may select filter information for correction of touch data based on a clock cycle in which a first pulse is generated in the first driving signal.

According to various embodiments of the disclosure, the electronic device 101 may include the touch sensor IC 253 and the display driver IC 230. The touch sensor IC 253 may be configured to determine a noise level of at least one touch sensor, and generate a third driving signal for controlling the display driver IC 230 in correspondence with the determined noise level. The display driver IC 230 may be configured to perform a third operation based on the third driving signal.

According to various embodiments of the disclosure, the touch sensor IC 253 may set the third driving signal to a high level, when the determined noise level is equal to or greater than a threshold level, and when the determined noise level is less than the threshold level, set the third driving signal to low.

According to various embodiments of the disclosure, the third operation may be an operation of causing the display driver IC to maintain a specified display driving frequency during a period of the third driving signal in which the third driving signal is at a high level.

According to various embodiments of the disclosure, the electronic device 101 may include the touch sensor IC 253 and the display driver IC 230. The display driver IC 230 may be configured to obtain image data and provide, to the touch sensor IC, a first driving signal including (i) a first pulse indicating an address scan period in which the image data is displayed on the display module via application of a voltage to at least one pixel from the plurality of pixels, and (ii) a second pulse indicating a self-scan period in which the display of the image data is maintained without application of the voltage.

According to various embodiments of the disclosure, while the first driving signal is provided from the display driver IC, the touch sensor IC is configured to perform a first operation based on detection of the first pulse, and perform a second operation based on detection of the second pulse.

According to various embodiments of the disclosure, the first operation is an operation of, based on a detection of the first pulse while the first driving signal is provided, causing the touch sensor IC to scan touch data inputted through at least one touch sensor device with a first periodicity.

According to various embodiments of the disclosure, while the first driving signal is provided, the touch sensor IC is configured to change a scan periodicity of the touch data in response to determining that the first pulse is changed to the second pulse. According to various embodiments of the disclosure, the first operation is an operation of, based on a detection of the first pulse while the first driving signal is provided, causing the touch sensor IC to discontinue scanning of touch data inputted through at least one touch sensor device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to some embodiments of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to some embodiments, the module may be implemented in a form of an application-specific integrated circuit (ASIC).

Various embodiments as set forth herein may be implemented as software (e.g., a program 340) including one or more instructions that are stored in a storage medium (e.g., internal memory 336 or external memory 338) that is readable by a machine (e.g., an electronic device 301). For example, a processor (e.g., a processor 120) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to some embodiments, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Further, the embodiments of the disclosure are presented for description and understanding of the disclosed technical content, and do not limit the scope of the technical scope of the disclosure. Accordingly, the scope of the disclosure should be construed to encompass all modifications or various other embodiments based on the technical spirit of the disclosure.

What is claimed:

1. An electronic device comprising:
a touch sensor integrated circuit (IC); and
a display driver IC,
a processor; and
a memory for storing instructions that, when executed by the processor, cause the electronic device to use the display driver IC to:
obtain display information for a display update, and
provide, to the touch sensor IC, a first touch driving signal including (i) a first pulse indicating an address scan period in which the display information is recorded via application of a voltage and (ii) a second pulse indicating a self-scan period in which the recorded information is maintained without application of the voltage,
wherein the first pulse and the second pulse occur during different time periods; and
wherein the instructions, when executed by the processor, cause the electronic device to use the touch sensor IC to: while the first touch driving signal is provided from the display driver IC:
perform a first operation based on detection of the first pulse having a first pulse width,
perform a second operation based on detection of the second pulse having a second pulse width, and
change a scan periodicity of the touch data inputted in response to determining that the first pulse of the first touch driving signal is changed to the second pulse.

2. The electronic device of claim 1, wherein the first operation is an operation of, based on a detection of the first pulse of the first touch driving signal while the first touch driving signal is provided, causing the touch sensor IC to scan touch data inputted through at least one touch sensor device with a first periodicity.

3. The electronic device of claim 1, wherein the first operation is an operation of, based on a detection of the first pulse of the first touch driving signal while the first touch driving signal is provided, causing the touch sensor IC to discontinue scanning of touch data inputted through at least one touch sensor device.

4. The electronic device of claim 2, wherein the second operation is an operation of, based on a detection of the second pulse of the first touch driving signal while the first touch driving signal is provided, causing the touch sensor IC to scan touch data inputted through the at least one touch sensor device with a second periodicity different from the first periodicity.

5. An electronic device comprising:
a touch sensor integrated circuit;
a display driver IC;
a processor; and
a memory for storing instructions that, when executed by the processor, cause the electronic device to use the display driver IC to:
obtain display information for a display update, and
determine an address scan period in which the display information is recorded via application of a voltage based on a first touch driving signal, and
provide, to the touch sensor IC, a second touch driving signal indicating the address scan period in which the recorded information is maintained without application of the voltage,
wherein the instructions, when executed by the processor, cause the electronic device to use the touch sensor IC to:
perform a first operation in correspondence with the address scan period of the second touch driving signal, and
perform a second operation in correspondence with the self-scan period of the second touch driving signal.

6. The electronic device of claim 5, wherein the first touch driving signal includes at least one of a first pulse related to the address scan period and a second pulse related to the self-scan period.

7. The electronic device of claim 5, wherein the instructions, when executed by the processor, cause the electronic device to use the display driver IC to: generate the second touch driving signal to indicate the address scan period or the self-scan period in correspondence with a pulse change timing of the first touch driving signal,
wherein the address scan period of the second touch driving signal corresponds to a period from a time of generating a first pulse of the first touch driving signal to a time of generating a second pulse of the first touch driving signal, and
wherein the self-scan period of the second touch driving signal corresponds to a period from the time of generating the second pulse of the first touch driving signal to the time of generating the first pulse of the first touch driving signal.

8. The electronic device of claim 5, wherein the first operation is an operation of causing the touch sensor IC to scan touch data inputted through at least one touch sensor device with a first periodicity during the address scan period of the second touch driving signal, and
wherein the instruction, when executed by the processor, cause the electronic device to use the touch sensor IC to: change a scan periodicity of the touch data in response to a change in a level of the second touch driving signal.

9. The electronic device of claim 5, wherein the first operation is an operation of causing the touch sensor IC to discontinue scanning of touch data inputted through at least one touch sensor device during the address scan period of the second touch driving signal.

10. The electronic device of claim 5, wherein the second operation is an operation of causing the touch sensor IC to scan touch data inputted through at least one touch sensor device with a second periodicity different from the first periodicity during the self-scan period of the second touch driving signal.

11. The electronic device of claim 5, wherein the instructions, when executed by the processor, cause the electronic device to use the display driver IC to:
determine a clock cycle corresponding to a display driving frequency, and
generate the first pulse according to the clock cycle while providing the first touch driving signal.

12. The electronic device of claim 11, wherein the instructions, when executed by the processor, cause the electronic device to use the touch sensor IC to: select filter information for correction of touch data based on a clock cycle in which a first pulse is generated in the first touch driving signal.

13. An electronic device comprising:
a touch sensor integrated circuit (IC);
a display driver IC;
a processor; and
a memory for storing instructions that, when executed by the processor, cause the electronic device to use the display driver IC to:
determine a noise lever of at least one touch sensor device, and
generate a touch driving signal for controlling the display driver IC based on a comparison of the determined noise level with a threshold level, and
wherein the instructions, when executed by the processor, cause the electronic device to use the display driver IC to: perform an operation based on the driving signal,
wherein based on a determination the determined noise level is greater than a threshold level, the touch sensor IC sets the touch driving signal to a high level, and
wherein based on a determination the determined noise level is less than the threshold level, the touch sensor IC sets the touch driving signal to a low level.

14. The electronic device of claim 13, wherein the operation is an operation of causing the display driver IC to maintain a specified display driving frequency during a period of the touch driving signal in which the driving signal is set to a high level.

15. An electronic device, comprising:
a touch sensor integrated circuit (IC);
a display driver IC;
a display module comprising a plurality of pixels;
a processor; and
a memory for storing instructions that, when executed by the processor, cause the electronic device to use the display driver IC to:
obtain image data, and
provide, to the touch sensor IC, a first touch driving signal including (i) a first pulse indicating an address scan period in which the image data is displayed on the display module via application of a voltage to at least one pixel from the plurality of pixels, and (ii) a second pulse indicating a self-scan period in which the display of the image data is maintained without application of the voltage,
wherein the instructions, when executed by the processor, cause the electronic device to use the touch sensor IC to:
while the first touch driving signal is provided from the display driver IC:
perform a first operation based on detection of the first pulse,
perform a second operation based on detection of the second pulse, and
change a scan periodicity of the touch data inputted in response to determining that the first pulse of the first touch driving signal is changed to the second pulse.

16. The electronic device according to claim 15, wherein the first operation is an operation of, based on a detection of the first pulse while the first touch driving signal is provided, causing the touch sensor IC to scan touch data input through at least one touch sensor device with a first periodicity.

17. The electronic device according to claim 15, wherein the first operation is an operation of, based on a detection of the first pulse while the first touch driving signal is provided, causing the touch sensor IC to discontinue scanning of touch data input through at least one touch sensor device.

* * * * *